(12) United States Patent
Taylor et al.

(10) Patent No.: US 7,528,189 B2
(45) Date of Patent: *May 5, 2009

(54) METAL-ACRYLATE CURING AGENTS

(75) Inventors: Donald W. Taylor, Liberty, MO (US); James W. Freitag, Kearney, MO (US); Don K. Howard, Liberty, MO (US)

(73) Assignee: Blue Goo, LLC, Ennis, TX (US)

( * ) Notice: Subject to any disclaimer, the term of this patent is extended or adjusted under 35 U.S.C. 154(b) by 331 days.

This patent is subject to a terminal disclaimer.

(21) Appl. No.: 10/978,081

(22) Filed: Oct. 27, 2004

(65) Prior Publication Data

US 2005/0119373 A1 Jun. 2, 2005

Related U.S. Application Data

(63) Continuation-in-part of application No. 10/729,339, filed on Dec. 4, 2003, now Pat. No. 7,208,538.

(60) Provisional application No. 60/430,882, filed on Dec. 4, 2002.

(51) Int. Cl.
*C08K 5/00* (2006.01)
(52) U.S. Cl. .................. 524/397; 525/502; 525/530; 525/531; 525/532
(58) Field of Classification Search .................. 525/502, 525/531, 530, 532; 524/397
See application file for complete search history.

(56) References Cited

U.S. PATENT DOCUMENTS

| 4,073,827 A | 2/1978 | Okasaka et al. |
| 4,146,698 A | 3/1979 | Anderson et al. |
| 4,178,423 A | 12/1979 | Anderson et al. |
| 4,614,674 A | 9/1986 | Lauterbach |
| 5,565,535 A | 10/1996 | Costin et al. |
| 5,656,703 A | 8/1997 | Costin et al. |
| 5,739,184 A | 4/1998 | Marbry et al. |
| 5,830,946 A | 11/1998 | Ozawa et al. |
| 6,100,336 A | 8/2000 | Sullivan et al. |
| 6,433,098 B1 | 8/2002 | Brown et al. |
| 6,559,238 B1 | 5/2003 | Brothers et al. |
| 6,849,337 B2 | 2/2005 | Ohrbom et al. |
| 2006/0235137 A1 | 10/2006 | Chae |

FOREIGN PATENT DOCUMENTS

| EP | 0294062 | 12/1988 |
| JP | 62 172974 A | 7/1987 |
| JP | 09111045 | 4/1997 |
| JP | 04198325 | 9/1997 |
| JP | 09287516 | 10/1997 |

OTHER PUBLICATIONS

Sartomer Application Bulletin—A Study of (Meth) Acrylate Functional Metallic Monomers as Additives for Improved Metal Adhesion of Coatings.
New Metal-Containing Acrylated Oligomers—Impart Excellent Adhesion in Coatings—By Deborah Smith, Sr. Application Chemist, UV/EB Adhesives/Sartomer Co., Exton, PA—pp. 32, 34, 35.
U.S. Appl. No. 10/729,339, filed Dec. 4, 2003, Taylor et al.
U.S. Appl. No. 11/003,758, filed Dec. 3, 2004, Taylor et al.
XP-002273412, Japan.
Unique Metal-Containing Acrylated Oligomers Impart Excellent Adhesion Characteristics—by Deborah Smith, Sr. Application Chemist, UV/EB Adhesives. Sartomer Co., Exton, PA.
Metallic Acrylate Modifier for Epoxy/Amine Systems.
Synthesis of Zinc-containing Epoxy Resin—Anand, M.; Srivastava, A.K.—J. Appl. Polym Sci. 1994 51, No. 22, Jan. 10, 1994 p. 203-11.
NDN 131-0103-7855-8: Synthesis of Zinc-containing Epoxy Resin.

*Primary Examiner*—Peter D Mulcahy
(74) *Attorney, Agent, or Firm*—Jack A. Kanz

(57) ABSTRACT

The disclosure relates to using metal acrylate compounds such as zinc diacrylate (ZDA), zinc dimethacrylate (ZDMA), among others for curing epoxy functional (and other crosslinking compounds), and to compositions containing such compounds for use in powder coat, film, adhesive, among other applications. ZDA and ZDMA containing compounds can cure the epoxy component of the compositions while being substantially free of conventional curing agents.

19 Claims, No Drawings

METAL-ACRYLATE CURING AGENTS

This application is a continuation in part of application Ser. No. 10/729,339, filed on Dec. 04, 2003 now U.S. Pat. No. 7,208,538, which claims the benefit of U.S. Provisional Application No. 60/430,882, filed on Dec. 04, 2002. The disclosures of these patent applications are hereby incorporated by reference.

FIELD OF THE INVENTION

The subject matter of the instant invention relates to metal acrylate curing agents. The subject matter also relates to using these curing agents to prepare useful compositions for use coatings, films adhesives, among other uses.

BACKGROUND OF THE INVENTION

Epoxy functional compounds and systems are known in this art and employed in a wide range of applications and formulations. By "epoxy functional system" it is meant to refer to a mixture or blend containing at least one epoxy functional compound and at least one curing agent for the compound. Examples of such systems comprise automotive and industrial adhesives/sealants, corrosion resistance coatings, films and paints, pre-preg, tapes, and hand lay-up structural composites, powder coatings/films/paints, adhesives, films, among other applications.

It is known in this art to employ curing agents to affect or control cross linking of epoxy functional compounds. Conventional epoxy curing agents include amines, polyamides, dicyandiamide, polysulfides, anhydrides, melamines, ureas, imidizole compounds, amidoamines, phenol/formaldehydes, boron trifluoride complexes, among other conventional curing agents. Formulations containing such epoxy curing agents can be heat activated. While these curing agents are effective at curing epoxy functional compounds, formulations containing these curing agents can have decreased shelf stability when catalysts are included (e.g., catalysts to decrease activation temperature), are incompatible with many types of fillers, produce either relatively soft or rough surfaces, can cause paint staining, dark or discolored film, shrinkage of the compound, among other undesirable characteristics. Epoxy functional systems such as coatings, films, adhesives, among others, that employ conventional curing agents also suffer these negative characteristics. Conventional curing agents may also be environmentally undesirable.

There is a need in this art for a curing agent for an epoxy functional system that results in a cured system having improved shrinkage, clear or no color, lower curing temperature, shelf stability, less charring, increased hardness, reduced paint staining, among other properties not achieved by conventional curing agents.

SUMMARY OF THE INVENTION

The instant invention solves problems associated with conventional curing agents by employing an effective amount of at least one metallic acrylate, metal diacrylate, monomethylacrylate, dimethacrylate compounds, among others. By an effective amount it is meant that the amount of metal diacrylate is sufficient to cure at least a portion of the resin composition, e.g., about 1 to about 50 wt. % and typically about 5 to about 20 wt. % of metal diacrylate (e.g., about 6 to about 12 wt %). The metal diacrylate can provide other benefits while also acting as a curing agent such as reduced shrinkage, improved clarity or transparent coatings, improved heat aging, improved shelf life. While any suitable metal diacrylate can be employed, examples of suitable diacrylates comprise at least one member selected from the group consisting of zinc diacrylate (ZDA), zinc dimethacrylate (ZDMA), magnesium diacrylate, aluminum diacrylate, aqueous solutions of metal acrylate monomers, among others. Zinc diacrylates and zinc dimethacrylates (e.g., ZDA and ZDMA) are especially useful for curing epoxy functional systems.

ZDA and ZDMA containing compounds will cure the epoxy functional component of the formulas while being substantially free of conventional curing agents. By substantially free of conventional curing agents, it is meant that an epoxy functional compound (or other compound curable with metal diacrylates or dimethacrylates), is cured while in the presence of less than about 0.1 to about 1.0 wt. % (e.g., about 0% of conventional epoxy curing agents) of the following compounds polyamides, dicyandiamides, imidizoles, imidizole compounds, amines, ureas, boron triflouride and complexes, polysulfides, anhydrides, melamines, amidoamines, phenol/formaldehyde, among other conventional curing agents. While the instant invention can be practiced in combination with such conventional curing agents, the instant invention obviates the necessity of such compounds, among other benefits.

The epoxy functional systems of the instant invention may be used in a wide range of applications such as automotive sealants, coatings including corrosion resistant coatings, adhesives, pipeline treatment or wrap, powder paints/coatings/films, films, liquid sealers in combination with UV activated compounds to provide dual cure functionality such as described in U.S. Pat. No. 6,461,691; hereby incorporated by reference (e.g., a system that is at least partially cured with UV and then heated for additional curing). These formulas are particularly useful in automotive, electronic, industrial, aerospace, among other applications.

DETAILED DESCRIPTION

The instant invention relates to using metal diacrylate compounds such as zinc diacrylate (ZDA), zinc dimethacrylate (ZDMA), mixtures thereof, among others for curing epoxy functional and other cross-linking or reactive compounds, and to systems containing such compounds (e.g., epoxy powder coatings, films, sealers, etc.). The metal diacrylates can be employed to cure a wide range of systems. Examples of such systems comprise at least one curable polymer selected from the group consisting of polybutadiene, melamine, isocyanates, epoxy and epoxy functional compounds such as bis A, bis F, cycloaliphatic epoxy, novolac, epoxy esters, polyesters, acrylates, phenolic modified alkyds, alkyds, acrylic alkyd copolymers, among other systems. The amount of curable polymer will normally range from about 1 to about 99 wt % (e.g., about 75 to about 90 wt. %)

The use of metal diacrylates such as zinc diacrylate (ZDA), zinc dimethacrylate (ZDMA), magnesium diacrylate, aluminum diacrylate, aqueous solutions of metal acrylate monomers, among others, as a curing agent, for example, epoxy functional systems (e.g., epoxy powder coatings, films, etc.), can be an effective replacement for dicyandiamide, amine, polyamide, polysulfides, anhydrides, melamines, ureas, imidizole compounds, boron tri-fluoride and complexes, amidoamines, phenol/formaldehyde or other conventional heat activated cures. The ability to reduce, if not eliminate, the usage of conventional curing agents can reduce environmental hazards that have been associated with many conventional curing agents. The metal diacrylate or dimethacrylate curing agents of the invention can be easily blended with solid or liquid epoxy resins, or mixtures of liquid and solid resins in order to produce epoxy functional systems such as relatively clear coatings, coatings with reduced shrinkage, different cure responses, among other properties. The replacement of dicyandiamide or other conventional curing compounds with metal diacrylate or dimethacrylate can usually be accomplished without significant changes in the manner in which the epoxy functional systems are prepared. The inventive epoxy functional systems are normally heat activated (e.g., at a temperature of about 300 F. to about 400 F. depending upon the length of heating time). However, the cure response of the metal diacrylate or dimethacrylate can also offer advantages over systems cured with dicyandiamide or other conventional cures. That is, the inventive acrylates curing ability is a generally linear function of time vs temp, rather than a relatively sharp peak at the melt point of a curing agent (e.g., as with dicyandiamide agents). Clarity, adhesion and stability, compatibility with fillers such as high ph silicates, plastic, and metallic powder, reactive resins among others, are aspects of the epoxy functional systems which can be improved with the inventive metal diacrylate curing agent. Epoxy functional systems which incorporate metal diacrylate or dimethacrylate as the curing mechanism have mechanical properties similar to conventionally cured formulas. The cure response is not dependent on melting point, but is normally time and temperature dependent. This can be very advantageous for many processes such as metal part painting, electronic component, aerospace, among other uses. End use applications can achieve desired mechanical properties such as toughness and flexibility among others, by adjusting time and temperature for each specific need.

The metal diacrylate can have a structure comprising:

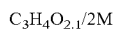

$C_3H_4O_{2.1}/2M$ wherein M can comprise at least one member selected from the group consisting of zinc (e.g., 2-propenoic acid zinc salt), aluminum, magnesium, tin, copper, nickel, aqueous solutions of acrylate (e.g., aqueous solutions of metal acrylate monomer such as zinc acrylate monomer), among others. While any suitable metal diacrylate or ZDA/ZDMA compounds or modified ZDA/ZMA compounds can be employed, examples of commercially available ZDA/ZDMA products comprise: SR 633, SR634, CN9016, CN 2401, CN2400, PC 300, PRO 5903, M Cure 204, SR 705, SR 706, SR 709 and aqueous solutions of zinc acrylate and a non-metallic acrylate monomer such as CD-664 and CD665 all of which are available from Sartomer, Exton Pa. 19341. Non-metallic acrylates (and other compatible organic compounds) can be combined with the metal diacrylate in order to modify the system, increase cure rate or hardness, among other beneficial improvements. The particle size of the metal diacrylate or dimethacrylate can be varied thereby permitting production of thin and thick film formulations (e.g., Sartomer® CN2400 and CN 2401 are commercially available as liquids; SR 9016 comprises particles ranging from about 40 to about 50 microns and SR 633 comprises particles having a standard 200 mesh). If desired, the metal diacrylate or dimethacrylate can be dispersed or dissolved within at least one carrier prior to compounding into a system, e.g., water and other solvents. When the metal diacrylate comprises ZDA/ZDMA, the amount of ZDA/ZDMA ranges from about 1 to about 75 wt. % and typically about 5 to about 20 wt. % of metal diacrylate (e.g., about 5 to about 10 wt. % for an epoxy functional system).

Without wishing to be bound by any theory or explanation it is believed that suitable metal diacrylate compounds may induce co-polymerization of an epoxide with the acrylic group through the nucleophilic Michael Addition reaction. The epoxide curing may begin with an initiation step of a proton addition to the oxirane ring. The proton can be taken from any available donor, e.g. water (moisture), acid, amine or phenolic modifier of the metal diacrylate. This first step can produce a reactive intermediate, e.g. $HOCH_2$—$CH$—, that will further react with the proton donor group, another epoxide or any other nucleophilic reagent, such as acrylic double bonds of ZDA. Acrylic double bonds are the known nucleophiles, e.g. acrylic acid will react with water under basic conditions, $CH_2$=$CH$—$COOH+H_2O \rightarrow HOCH_2$—$CH_2COOH$.

Without wishing to be bound by any theory or explanation, it is also believed that the reaction between the activated epoxide and the diacrylate could be as follows:

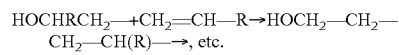

$HOCHRCH_2$—+$CH_2$=$CH$—$R \rightarrow HOCH_2$—$CH_2$—$CH_2$—$CH(R)$—→, etc.

The aforementioned reaction between an epoxy functional compound and a metal diacrylate such as ZDA can produce a uniform clear solid formation having an improved thermal stability, e.g., due to the structure of an ionomer with —Zn— in the main polymer chain.

In one aspect of the invention, the inventive curing agent reduces shrinkage in comparison to conventional curing agents. That is, epoxy functional resin compositions were observed to have less shrinkage when compared to the same resin cured with dicyandiamide. Normally, systems cured with the inventive curing agent shrink less than 2% (e.g., in comparison to greater than about 2% to about 8% with conventional curing agents).

In one aspect of the invention, ZDA/ZDMA cured epoxy systems are more compatible with additives and fillers. This allows greater versatility in the formulation of epoxy, melamine, isocyanurates, polysiloxane, alkyds, phenolic modified alkyds, acrylic alkyd copolymers, polyesters, epoxy esters and polybutadiene containing systems, e.g., adhesives, sealers, coatings, among other systems. In contrast to conventional curing agents such as dicyandiamides, ZDA/ZDMA are more compatible with acid type, and high pH, among other fillers. For example, the inventive system permits curing epoxy containing systems that include high pH silicate fillers (e.g., a system comprising epoxy, calcium silicate and metallic diacrylate). Such systems are normally difficult, if not impossible, to cure with conventional curing agents due to an undesired reaction between dicyandimiade and calcium silicate (e.g., which cause compound to foam).

Formulations or systems of the instant invention can be compatible with a wide range of filler materials. Examples of such filler materials comprise at least one from the group consisting of silicates such as calcium, sodium, potassium, lithium, aluminum, magnesium, among others; trihydrates such as aluminum trihydrate; carbonates, bitumins (e.g., gilsonite), clays, nitrides such as aluminum nitride, boron nitride and silicon nitride, carbides such as silicon carbide, silica, metallic powders (e.g., ferrous and non-ferrous metals such as copper, zinc, aluminum, iron, among others), among other fillers. In some cases, the filler materials can be employed for modifying the torque tension (e.g., for threaded fasteners), lubricity, wear resistance, colorants, conductivity, among other surface characteristics. The amount of filler can vary depending upon the desired properties in the cured formulation, and will typically range from about 1 to at least 70 wt % (e.g,. about 5 to about 25 wt. %).

Many current sealing tapes and structural adhesive tapes are formulated using epoxidized elastomers or epoxy elastomer blends. In many cases, additions of filler, thixotropes and pigments are added to achieve the required texture, color, or other physical characteristics that are necessary for application. The addition of these ingredients may decrease the performance of the tape in application, especially in structural tapes or pastes. A reactive resin may be used in the powder composition of the instant invention as the filler or pigment component in order to overcome the decrease in performance seen in conventional cure systems. Examples of reactive resins comprise at least one member selected from the group consisting of epoxy, phenoxy, acrylic urethane, mixtures thereof, among others. The amount of reactive resin normally comprises about 10 to about 95 wt. % of the composition or system (e.g., about 20 to about 50 wt. %). Curing of the composition containing the reactive resin may be accomplished by convection heating, induction heating, radiant heating, radiation, among other methods.

The elevated temperature melt point of powder resins allows the incorporation of the powder resins in tape or paste formulas without the resin being dissolved into the composition. The resin remains suspended in the tape or paste composition, and provides properties very similar to formulas using non-reactive fillers to adjust the consistency of the composition. When the tape or paste composition is heated to the activation point of the reactive resin, increased strength and toughness among other properties can be greatly improved over formulas which contain non-reactive fillers. For example, a reactive resin system comprising ZDA is also thermosetting at a given application or heating temperature (e.g., a composition comprising epoxy resin and ZDA can be employed as a filler in another formation).

Formulations or systems of the instant invention can be employed for obtaining a relatively clear or colorless product. In contrast to conventional curing agents that impart an amber or dark hue, the inventive formulations can be substantially clear (depending upon the thickness, formulation composition, among other parameters). Color of epoxy formulations was measured in accordance with conventional practices and using the Gardner scale. Gardner color for dicyandiamide cured epoxy was 8-10 whereas Gardner color for same system but cured with ZDA (e.g., commercially available from Sartomer as Sr9016), was about 2 to 4.

The instant invention can be employed for tailoring the curing rate. Conventional curing agents typically have a rapid cure which is undesirable for certain applications. The curing rate of the instant invention can be increased by exposure to higher temperatures, and decreased by lower temperatures. The ability to control curing rate (and temperature) is desirable in that such permits finished coating surfaces to be optimized for smoothness, hardness, gloss, and clarity. Generally a higher curing temperature also results in an increased hardness.

The instant invention can be employed for tailoring the activation temperature of formulations. The activation or curing temperature can range from about 275 to about 425° F. depending upon the thickness, amount of curing agent, composition of system being cured, method of heating, among other conventional variables. Generally a thinner coating will require less heat and time to cure, and the higher the curing temperature the harder the resultant coating. Additions of titanates, zirconates, among other complexing agents can be used for lowering the cure temperature of the inventive formulations. The amount of complexing agent will normally range from about 1 to about 20 wt. % of the composition or formulation. For example, adding 1-5% of a commercially available titanate (Lica 38J supplied by Kenrich) is effective at lowering the cure temperature of formulations containing epoxy functional compounds as the base polymer (e.g., to a cure temperature to less than 250° F.).

In one aspect of the invention one or more additives are included in the inventive formulations. Examples of such additives comprise at least one member selected from the group of fillers, metal powders (e.g., zinc, aluminum, iron, steel, copper, among other metal powders), magnetic materials, ceramic powders, plastic powders, resins (e.g., silicone, silanes, polysiloxanes, titanates and zirconates), among others. Formulations incorporating at least one polysiloxane, at least one metallic powder and at least one ceramic powder can be used when increased temperature resistance is desired (e.g., a coating or formulation formed into a tape and applied onto a pipeline). These additives will normally comprise about 1 to about 25 wt. % of the composition.

In another aspect of the invention, the inventive system is placed (e.g., extruded, dipped, sprayed, brushed applied or wiped on), upon a reinforcement. The reinforcement can be located upon or within the inventive blend, e.g., a sandwich or laminate structure. The reinforcement permits easier handling during application and/or manufacture, reduces flow (or sagging) when the inventive system is exposed to increased temperatures, increases tensile strength, improves abrasion resistance, among other characteristics. Depending upon the desired properties, e.g., temperature resistance, the reinforcement material can comprise any suitable material. The reinforcement material normally comprises a scrim, web, matte, mesh, perforated or un-perforated polymer films, an unwoven or a woven assemblage, among other fibrous or film type reinforcements. When employing a scrim as the reinforcement (e.g., a fiberglass scrim having generally round fibers and approximately 12 squares per inch), the reinforcement can have an open surface area of greater than 20 to at least about 80%. When the reinforcement material comprises a perforated polymer or metallic film, the reinforcement material can have an open surface area or porosity of about 1 to at least about 80%. The open surface area also allows a reinforced system to retain its flexibility. Examples of suitable reinforcement materials comprise fiberglass, polypropylene, polyethylene, polyester, fluoropolymers, graphite, plastics, Kevlar®, aluminum, steel, copper, brass, cheesecloth, mixtures thereof, among other materials. Additional examples of reinforcement materials are described in U.S. Pat. No. 6,034,002, issued Mar. 07, 2000 and entitled "Sealing Tape For Pipe Joints", and U.S. Pat. Nos. 5,120,381 and 4,983,449; each of the previous US Patents are hereby incorporated by reference. While the reinforcement material can have any suitable porosity or weave density, in most cases the porosity of the reinforcement material is such that the inventive composition is self-adhering (or self-sealing). For example when employing a reinforced inventive composition as a pipe wrap, the composition at least partially passes through the material in a manner sufficient for the blend to adhere to itself as the blend is being wrapped around the pipe, e.g., the blend passes through the reinforcement thereby permitting the blend to bond to itself. The self-adhering characteristic normally obviates the need for primers or pre-treatments, and increases the efficiency with which the reinforced composition covers a surface. In another example, bubbling or blistering of the tape or coating during the cure process can be reduced, if not eliminated, by employing a reinforcement. Reducing bubbling or blistering is particularly desirable if the inventive system is employed as a paintable automotive sealant (e.g. so-called automotive "roof ditch" sealant).

If desired, the reinforcement material can be coated or pretreated with an emulsion, dispersion, UV reactive (including reactive to sunlight), electron beam active, water or solvent based systems, 100% solids, powder coat systems, or other composition for sizing the reinforcement material, e.g., the reinforcement material is coated with an emulsion for increasing the rigidity of the material thereby permitting the material to be cut to a predetermined size or configuration. The coating can be applied by any suitable methods known in the art such as dipping, laminating, spraying, roller coating, among others. Examples of suitable coatings for the reinforcement material comprise at least one of polyvinyl alcohol, ethylene vinyl acetate, acrylic, urethane, epoxy, polyurethane or latex emulsions. Another example of a suitable coating for the reinforcement material comprises oligomers, monomers, additives, and a photo-initiator (e.g., ionium salts).

In another aspect of the invention, formulations containing the metal diacrylate curing agent have an improved shelf life relative to conventional curing agents. For example, the inventive formulation is stable for at least 120 days without special packaging or refrigeration whereas formulations containing conventional curing agents are typically stable for about 90 days.

In a further aspect of the invention, the inventive formulations or system are employed as a corrosion resistant coating. For example, a zinc plated article or component treated in accordance with the process described in U.S. Pat. Nos. 6,149,794; 6,258,243; 6,153,080; 6,322,687 and PCT Patent Application Publications PCT/U.S.02/24716; PCT/U.S.02/24617 and PCT/U.S.02/24446 (all of which are hereby incorporated by reference), is coated with the inventive system. The coated article has increased corrosion resistance when measured in accordance with ASTM B-117.

The inventive formulation can be employed for improving conventional epoxy functional coatings. The inventive formulation can be used for curing epoxy functional coatings such as e-coats, powder coatings, adhesives, among others. For example, an inventive coating comprising an epoxy powder and a metal diacrylate curing agent (e.g., ZDA and substantially free of dicyandiamides), can be applied or sprayed upon a metal article. The metal article is then heated in order to fuse and cure the epoxy coating. In one aspect, a ZDA containing epoxy powder coating is applied onto a pipe, heat cured and then buried. By employing the inventive coating, a tightly bonded coating can be obtained without using curing agents such as dicyandiamides.

In another aspect of the invention, the inventive formulations or systems can be modified by an additive comprising cubes or particulates. Particularly desirable results can be achieved by employing cubes comprising nylon 6/12, nylon 6/6 or other commercially available materials (e.g., 0.04/0.08/0.10 inch cubes available commercially from Maxi-Blast). In some cases the cubes or media can comprise metallic materials such as copper, aluminum, among other metals (e.g., about 10 to about 60 wt % metallic materials especially if improved conductivity is desired). The cubes function as an in situ dampener or spacer that increases the compressive strength of the inventive system. When the system is employed as a sealant (e.g., automotive sealant), the cubes reduce the tendency of the sealant to be forced out of a seam or joint formed between at least two members being sealed, e.g., two metal members. That is, the cubes define the minimum distance between two members such that the sealant is retained in the joint. Normally, the amount of this additive ranges from about 0.1 to about 5 wt. % of the system.

The combinations of the instant invention can be prepared by any suitable method such as kneading, batch mixing, extrusion, among other methods. While the above description has emphasized using the inventive composition for automotive and industrial coatings/paints/sealers, structural reinforcement, sealants and tapes, the instant invention can be employed in wide array of application such as decorative crafts, glazing, concrete aggregate, gels, structural reinforcement, among other applications.

The combinations of the instant invention can be applied by any method that is conventional for a given end use such as manual or robotic applications. If desired, the inventive combinations can be fabricated into a tape that is dispensed or applied by using the apparatus and method described in U.S. patent application Ser. No. 10/087,930 (Sharpe); hereby incorporated by reference.

The following Examples are provided to illustrate certain aspects of the instant invention and shall not limit the scope of any claims appended hereto.

EXAMPLES

Examples 1-8 demonstrate ZDA/ZDMA compositions used for coatings. These compositions were prepared by hand mixing or mechanical stirring (i.e., an air motor with an impeller) in a beaker under ambient conditions.

| Material | Description | Supplier | wt percent |
|---|---|---|---|
| Example 1 | | | |
| Uvacure 1500 | Cycloaliphatic | Radcure | 90% |
| SR 633 | Zinc Diacrylate | Sartomer | 10% |
| Example 2 | | | |
| Epalloy 8240 | Novolac | CVC specialties | 90% |
| SR 633 | Zinc Diacrylate | Sartomer | 10% |
| Example 3 | | | |
| Epon 828 | Bis A | Resolution | 90% |
| SR 633 | Zinc Diacrylate | Sartomer | 10% |
| Example 4 | | | |
| Epon 872 | Bis F | Resolution | 90% |
| SR 633 | Zinc Diacrylate | Sartomer | 10% |
| Example 5 | | | |
| Ricon 100 | Polybutadiene | Sartomer | 90% |
| SR 633 | Zinc Diacrylate | Sartomer | 10% |
| Example 6 | | | |
| Aerotex 3030 | Melamine | Cytec | 90% |
| SR 633 | Zinc Diacrylate | Sartomer | 10% |
| Example 7 | | | |
| Epon 828 | Bis A | Resolution | 90% |
| PRO 5903 | Mg Diacrylate | Sartomer | 10% |
| Example 8 | | | |
| Epon 828 | Bis A | Resolution | 88% |
| PC 300 | Zinc Diacrylate | Sartomer | 10% |
| Lica 38J | Titanate | Kenrich | 2% |

Examples 9-10 demonstrate ZDA/ZDMA containing systems that were prepared using commercially available materials (e.g., Sartomer® ZDA's: SR 634, SR 9016, and CN 2400). Example 9 illustrates using the inventive compositions to form a coating and Example 10 illustrates making a tape from the inventive compositions.

Example 9

The formula listed below was prepared and applied by hand onto a steel panel and cured at 400° F. in air for 10 minutes.

| Material | Description | Supplier | wt. % |
|---|---|---|---|
| Uvacure 1500 | cycloaliphatic epoxy | Radcure | 44% |
| Epon 8240 | novolac epoxy | CVC specialties | 44% |
| SR 9016 | Zinc Diacrylate | Sartomer | 10% |
| Z 6040 | silane | Dow | 2% |

If desired, the above formula and other coatings disclosed herein can be employed as a sealer or top coating for metallic surfaces previously treated in accordance with U.S. Pat. Nos. 6,149,794; 6,258,243; 6,153,080; 6,322,687 and PCT Patent Application Publications PCT/US02/24716; PCT/US02/24617 and PCT/US02/24446; hereby incorporated by reference.

Example 10

The inventive compositions can be fabricated into a tape. Such tapes can be used for improving the corrosion resistance of a steel pipeline. An example of such usage is described in U.S. patent Application Publication No. US-2002-0013389-A1; hereby incorporated by reference. These tape formulations, which are listed below in Tables 1 and 2, were prepared by mixing in a Baker Perkins double arm mixer.

TABLE 1

| Material | Description | Supplier | wt. % |
|---|---|---|---|
| Vamac G | ethylene acrylic rubber | DuPont | 7.5% |
| ZOCO 104 | zinc oxide | ZOCO | 1.25% |
| Gilsonite MP | gilsonite | Lexco | 12.5% |
| Hubersorb 600 | calcium silicate | Huber | 12.5% |
| SU 2.5 | epoxy | Resolution | 25% |
| Trilene 65 | EPDM rubber | Uniroyal | 37.5% |
| SR633 | zinc diacrylate | Sartomer | 3.75% |

TABLE 2

| Material | Description | Supplier | wt. % |
|---|---|---|---|
| Vamac G | ethylene acrylic rubber | DuPont | 10% |
| ZOCO 104 | zinc oxide | ZOCO | 1% |
| Z 6018 | polysiloxane | Dow corning | 12.25% |
| HM 443 | metallic powder | Hoosier | 47% |
| LERE HH | epoxy/phenoxy | Inchemrez | 20% |
| Viton A | fluoro elastomer | Dupont Dow Elastomers | 5% |
| SR633 | zinc diacrylate | Sartomer | 3.75% |
| Lica 38J | titanate | Kenrich | 1% |

Examples 11-13

Examples 11-13 demonstrate using ZDA containing materials as a reinforcement material, e.g., a material applied onto an automotive component wherein the material becomes rigid after exposure to heating in a paint oven (e.g., refer to U.S. Pat. Nos. 5,040,803; 5,151,327, 5,755,486; all of which are hereby incorporated by reference). These materials comprised modified and unmodified epoxy resins as a base or master batch to which mineral fillers and nitrile rubber were added for dimensional control during forming, handling, vehicle installation, among other purposes. Three materials having the formulations listed in Table 3 below were prepared by mixing in a sigma blade mixer with subsequent heated pressing to obtain a composite comprising a laminate with fiberglass cloth reinforcement. The composite was applied to cold rolled steel test panels and baked at 350° F. for 30 minutes. The flexural strength of the baked test panels was measured on an Instron tensile testing machine in accordance with conventional procedures with the resulting in the data listed below in Table 4.

TABLE 3

| | | | Formulations | | |
|---|---|---|---|---|---|
| Material | Description | Supplier | Example 11 (%) | Example 12 (%) | Example 13 (%) |
| NySyn 33-3 | Nitrile Rubber | Zeon Chemicals | 6.96 | 6.81 | 6.66 |
| Epon 58005 | CTBN Rubber Modified Bis-A Epoxy | Resolution | 9.05 | 8.85 | 8.66 |
| SB 222 | Alumina Trihydrate | J. M. Huber | 10.72 | 10.49 | 10.26 |
| Isolene 400 | Polyisobutylene (Liquid) | Elementis Specialties | 5.57 | 5.45 | 5.33 |
| Epon 872 | Bis-A Epoxy | Resolution | 11.14 | 10.9 | 10.66 |
| InChemRez LER-HH | Phenoxy modified Bis-A Epoxy | Phenoxy Associates | 20.05 | 19.61 | 19.19 |
| Epon 834 | Bis-A Epoxy | Resolution | 15.59 | 15.25 | 14.93 |
| 3M K37 Glass Bubbles | Hollow Glass Spheres | 3M | 22.28 | 21.79 | 21.33 |
| Cab-O-Sil TS720 | Silane Treated Fumed Silica | Cabot | 1.78 | 1.74 | 1.71 |
| Black | Carbon Black | Cabot | 0.89 | 0.87 | 0.85 |
| Sartomer SR633 | Zinc Diacrylate | Sartomer | 2.23 | 4.36 | 6.40 |

TABLE 4

| Flexural Strength (Pounds) | | |
| --- | --- | --- |
| Example 11 | Example 12 | Example 13 |
| 30.61 | 36.52 | 36.78 |

Table 4 illustrates an increase in flexural strength. Without wishing to be bound by any theory or explanation, it is believed that the increase in flexural strength is caused by curing or cross-linking the epoxy resins during the bake process. While there are no adverse affects, Table 4 indicates that no additional flexural strength is achieved by adding greater than about 20 parts (6.5%). In addition to improving the flexural strength, ZDA additions increased adhesion with the cold rolled steel substrate, i.e., all three formulations demonstrated cohesive bonds to the cold rolled steel substrate.

Examples 14-20

Examples 14-20 demonstrate applying the inventive compositions onto a zinc substrate that had been pretreated in a silicate-containing medium (i.e., known as the EMC™ process). The coatings were either mixed by hand or mixed with a high-speed disperser. The pretreatment process is described in U.S. Pat. Nos. 6,149,794; 6,258,243; 6,153,080; 6,322,687 and PCT Patent Application Publications PCT/U.S.02/24716; PCT/U.S.02/24617 and PCT/U.S.02/24446; hereby incorporated by reference. The inventive coatings were applied onto 2"×3" zinc plated substrates. The substrates were cleaned with isopropyl alcohol prior to coating. The substrate was dipped into the coating for approximately 10 sec. The coated substrate was removed and hung vertically. The coating was cured for 20 min. at 340° F. The coating compositions used in Examples 14-20 and evaluation of the coating effectiveness are listed below (CRS=Cold Rolled Steel).

| Material | Example 14 | Example 15 | Example 16 |
| --- | --- | --- | --- |
| Epon 828 (Epoxy from Resolution) | 50 g | 50 g | 20 g |
| Erisys EMRM-20 (Elastomer Modified Epoxy from CVC Specialty) | | 15 g | |
| Cardura E-10P (Glycidyl Ester from Resolution) | 25 g | 35 g | 55 g |
| Veova 10 (Vinyl Ester from Resolution) | 25 g | | 25 g |
| DAPRO U-99 (Interfacial Tension Modifier from Elementis) | 0.2 g | | |
| Z6040 (Silane from Dow Corning) | | 0.2 g | 0.2 g |
| SR 706 (Modified Metallic Diacrylate from Sartomer) | 20 g | 15 g | 10 g |
| Cured Properties | | | |
| Surface Cure | Good | Good | Good |
| Cross Hatch Adhesion: Initial (CRS) | Good: 0% Coating Loss | Good: 0% Coating Loss | Good: 0% Coating Loss |
| Cross Hatch Adhesion: Initial (EMC) | Good: 0% Coating Loss | — | — |

| Material | Example 17 | Example 18 |
| --- | --- | --- |
| Epon 828 (Epoxy from Resolution) | 50 g | 50 g |
| Veova 10 (Vinyl Ester from Resolution) | 50 g | 50 g |
| DAPRO U-99 (Interfacial Tension Modifier from Elementis) | | 1 g |
| Z6040 (Silane from Dow Corning) | 0.2 g | 0.2 g |
| SR 706 (Modified Metallic Diacrylate from Sartomer) | 10 g | 10 g |
| Surface Cure | Good | Good |
| Cross Hatch Adhesion: Initial (CRS) | Good: 0% Coating Loss | Good: 0% Coating Loss |
| Cross Hatch Adhesion: Initial (EMC) | — | Good: 0% Coating Loss |

| Material | Example 19 | Example 20 |
|---|---|---|
| Epon 828 (Epoxy from Resolution) | 50 g | 50 g |
| Veova 10 (Vinyl Ester from Resolution) | 50 g | 50 g |
| Baghouse Fines (Sodium Silicate) | 3 g | |
| Supernat D10 (Synthetic Amorphous Silicon Dioxide from Degussa) | | 3 g |
| DAPRO U-99 (Interfacial Tension Modifier from Elementis) | 1 g | 1 g |
| Z6040 (Silane from Dow Corning) | 1 g | 1 g |
| SR 706 (Modified Metallic Diacrylate from Sartomer) | 10 g | 10 g |
| Pre-Bake | None | None |
| Surface Cure | Good | Good |
| Cross Hatch Adhesion: Initial (CRS) | Good: 0% Coating Loss | Good: 0% Coating Loss |
| Flexibility | Good: 90° with no cracks but has some signs of stress. Has good adhesion at the bend, also looks good at 180° | Good: 90° with no cracks but has some signs of stress. Has good adhesion at the bend, also looks good at 180° |

Examples 21-25

Tables #1 and 2 demonstrate powder coat and film adhesive formulations. The powder coat formulations of Table 1 were prepared by heating the epoxy (or phenoxy) resin components to about 140C in order to melt the solid epoxy and the epoxy components were mixed to form a homogenous mixture. The diacrylate was added and mixed into the molten epoxy mixture (or phenoxy mixture), and then the mixture was force cooled on a chilled plate. The cooled mixture was ground with a ball mill to form a powder having a mesh of about 200 mesh.

The film of Table 2 as prepared by combining and heating and cooling the mixtures as previously described in connection with the powder coat formulations of Table 1. The powder was then placed between release papers and converted into a film on a heated Carver Lab Press. A film of about 10 mils in thickness was produced. Thinner films can be obtained by applying greater pressure.

TABLE #1

Example Powder Coat Formulas

| | Compound | Compound Description | Wt % | Supplier |
|---|---|---|---|---|
| Example 21 | Epon 1002 | Solid epoxy resin | 90 | Resolution |
| | SR 9016 | Metal diacrylate | 10 | Sartomer |
| Example 22 | Epon 1007 | Solid epoxy | 60 | Resolution |
| | Epon 828 | Liquid epoxy | 30 | Resolution |
| | SR 9016 | Metal diacrylate | 10 | Sartomer |
| Example 23 | Epon 1009 | Solid epoxy | 50 | Resolution |
| | Epon 828 | Liquid epoxy | 40 | Resolution |
| | SR 9016 | Metal diacrylate | 10 | Sartomer |

Example 22 was repeated with the exception that the solid epoxy was replaced with phenoxy resin.

TABLE #2

Example Adhesive Film Formulations

| | Compound | Compound Description | Wt % | Supplier |
|---|---|---|---|---|
| Example 24 | Epon 1009 | Solid epoxy | 40 | Resolution |
| | Epon 828 | Liquid epoxy | 40 | Resolution |
| | TC 140 | Ethylene methyl acrylate | 10 | ExxonMobile |
| | SR 9016 | Metal diacrylate | 10 | Sartomer |
| Example 25 | Epon 1007 | Solid epoxy | 20 | Resolution |
| | Epon 1002 | Solid epoxy | 20 | Resolution |
| | Epon 828 | Liquid epoxy | 40 | Resolution |
| | TC 140 | Ethylene methyl acrylate | 10 | ExxonMobile |
| | SR 9016 | Metal diacrylate | 10 | Sartomer |

Examples 26-32

This Example demonstrates using metal acrylates for curing systems other than epoxy functional systems, and that the cure temperature can affect curing. The formulations listed below were mixed 10 in a plastic cup by hand. Approximately 7-10 g of the blend was poured into a tin lid (≈50.15 mm diameter x≈7.5 mm height). The material was then cured at a designated temperature and time. Observations were made for signs of curing. Observations were also made for shrinkage.

| Formulation | Example 26 | Example 27 | Example 28 | Example 29 |
|---|---|---|---|---|
| Chempol 211-3369 (High Solids Polyester from Cook Composites & Polymers) | 10 g | | | |

-continued

| Formulation | Example 26 | Example 27 | Example 28 | Example 29 |
|---|---|---|---|---|
| Chempol 812-2218 (High Solids Phenolic Modified Alkyd from Cook Composites & Polymers) | | 10 g | | |
| Chempol 910-0453 (Water Reducible Epoxy Ester from Cook Composites & Polymers) | | | 10 g | |
| Chempol 810-0089 (Water Reducible Chain Stopped Alkyd from Cook Composites & Polymers) | | | | 10 g |
| SR 705 (Metallic Diacrylate from Sartomer) | 1 g | 1 g | 1 g | 1 g |
| Cure Observations | 275 F./15 mins No Signs of Cure | 275 F./15 mins No Signs of Cure | 275 F./15 mins Partial Cure | 275 F./15 mins Partial Cure |
| Cure Observations | 350 F./15 mins Very Slight Cure | 350 F./15 mins Very Slight Cure | 350 F./15 mins Good Cure No Shrinkage Noticed | 350 F./15 mins Good Cure No Shrinkage Noticed |

| Formulation | Example 30 | Example 31 | Example 32 |
|---|---|---|---|
| Chempol 810-1537 (Acrylic Alkyd Copolymer from Cook Composites & Polymers) | 10 g | | |
| Chempol 816-1200 (High Solids Epoxy Ester Adduct from Cook Composites & Polymers) | | 10 g | |
| Chempol 210-9889 (Water Reducible Polyester from Cook Composites & Polymers) | | | 10 g |
| SR 705 (Metallic Diacrylate from Sartomer) | 1 g | 1 g | 1 g |
| Cure Observations | 350 F./15 mins Partial to Good Cure No Shrinkage Noticed | 350 F./15 mins Partial to Good Cure No Shrinkage Noticed | 350 F./15 mins Very Slight Cure |

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention and the appended claims.

The following is claimed:

1. A film adhesive comprising a heat curable composition comprising at least one epoxy functional compound, and about 5 to about 20 wt. percent of at least one metal acrylate curing agent and wherein the composition is substantially free of conventional curing agents.

2. The film adhesive of claim 1 comprising a heat curable composition comprising at least one curable compound, and at least one curing agent selected from the group consisting of metal acrylates, metallic diacrylates, metallic dimethacrylates and metallic monomethacrylate wherein the composition is substantially free of peroxides, amines, polyamides, dicyandiamide, polysulfides, anhydrides, melamines, ureas, anhydrides, imidazole and imidazole compounds, boron trifluoride and complexes, amidoamines, and phenol/formaldehydes.

3. The film adhesive of claim 1 wherein the film adhesive is reinforced.

4. The film adhesive of claim 3 wherein the reinforcement comprises at least one member selected from the group consisting of scrim, web, matte, mesh, perforated or unperforated films and woven or unwoven assemblage.

5. The film adhesive of claim 1 wherein the epoxy functional compound comprises at least one member selected from the group consisting of polybutadiene, melamine, isocyanates, bis A epoxy, bis F epoxy, cycloaliphatic epoxy, novolac compounds, epoxy esters, alkyds and alkyd functional materials, polyesters and acrylates.

6. The film adhesive of claim 1 wherein the film adhesive further comprises at least one filler selected from the group consisting of at least one silicate, silica, trihydrates, carbonates, bitumins, and clays.

7. The film adhesive of claim 1 wherein the composition further comprises at least one filler material selected from the group of reactive resin composition.

8. The film adhesive of claim 1 wherein the film adhesive further comprises at least one additive selected from the group consisting of metal powders, magnetic materials, ceramic powders, plastic powders and resins.

9. The film adhesive of claim 1 wherein the composition further comprises at least one reinforcement.

10. The film adhesive of claim 9 wherein the reinforcement comprises at least one of fibers or film.

11. The film adhesive of claim 2 further comprising at least one complexing agent selected from the group consisting of zirconates and titanates.

12. The film adhesive of claim 1 wherein the metal acrylate curing agent comprises at least one member selected from the group consisting of zinc diacrylate, zinc dimethacrylate, magnesium diacrylate, mixtures thereof and aqueous solutions thereof.

13. The film adhesive of claim 2 wherein the metal acrylate curing agent comprises at least one of zinc diacrylate and dimethacrylate.

14. The film adhesive of claim 12 wherein the metal acrylate curing agent comprises at least one of zinc diacrylate, zinc dimethacrylate and magnesium diacrylate.

15. The film adhesive of claim 1 further comprising at least one member selected from the group consisting of silanes and polysiloxanes.

16. A powder coat comprising a heat curable composition comprising at least one epoxy functional compound, and about 5 to about 20 wt. percent of at least one metal acrylate curing agent and from about 20 to about 50 wt. percent of a reactive resin and wherein the composition is substantially free of conventional curing agents.

17. The powder coat of claim 16 wherein the coating comprises at least one member selected from the group consisting of epoxy functional e-coatings and epoxy functional powder coatings.

18. The powder coat of claim 16 wherein the reactive resin is selected from the group consisting of epoxy, phenoxy, acrylic urethane and mixtures thereof.

19. The powder coat of claim 16 comprising a heat curable composition comprising at least one curable compound, and at least one curing agent selected from the group consisting of metal acrylates, metallic diacrylates, metallic dimethacrylates and metallic monomethacrylate wherein the composition is substantially free of peroxides, amines, polyamides, dicyandiamide, polysulfides, anhydrides, melamines, ureas, anhydrides, imidazole and imidazole compounds, boron trifluoride and complexes, amidoamines, and phenol/formaldehydes.

* * * * *